United States Patent
He et al.

(10) Patent No.: US 8,484,635 B1
(45) Date of Patent: Jul. 9, 2013

(54) UNIFIED INSTALLATION FOR HETEROGENEOUS STORAGE SYSTEMS

(75) Inventors: Ping He, Cary, NC (US); Hwai-Yeng Chan, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 241 days.

(21) Appl. No.: 12/981,050

(22) Filed: Dec. 29, 2010

(51) Int. Cl.
*G06F 9/445* (2006.01)
(52) U.S. Cl.
USPC .......................................... 717/176; 717/171
(58) Field of Classification Search
None
See application file for complete search history.

(56) References Cited

U.S. PATENT DOCUMENTS

2001/0029605 A1 * 10/2001 Forbes et al. ................... 717/11

* cited by examiner

*Primary Examiner* — Chuck Kendall
(74) *Attorney, Agent, or Firm* — Guerin & Rodriguez, LLP

(57) ABSTRACT

A unified scribed image for installing software on different storage system platforms and configurations is described. The scribed image is produced by installing on a reference storage system reference system software including reference system core components usable by all storage systems, and reference system unique components used only by the reference storage system. Reference system software representing shared components used by pairs of storage systems is added. The reference system software related to the reference system unique components is then removed. The remaining core components and shared components to are scribed to media to produce the unified scribed image. Methods of using the unified scribed image to install storage system software in various storage systems are also described.

18 Claims, 14 Drawing Sheets

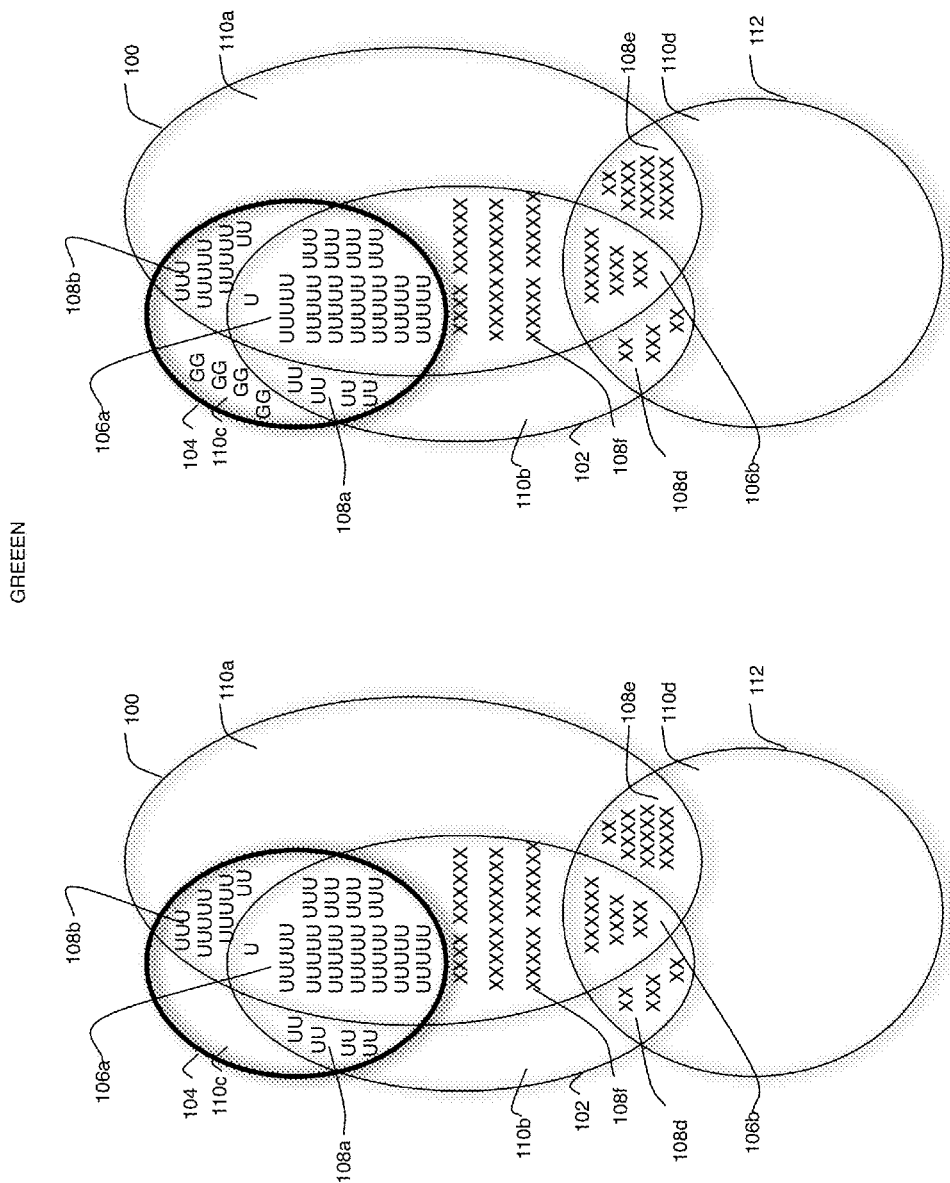

UNIFIED INSTALLATION FOR HETEROGENEOUS STORAGE SYSTEMS

FIELD OF THE INVENTION

The present invention relates generally to software installation on storage systems. More particularly, the invention relates to installation of software in storage systems wherein many different configurations of the storage system are available.

BACKGROUND

The software installation process for a typical storage system is particular to the storage platform and sometimes to particular configurations of that platform. But today, storage providers are providing many different platforms, each with many different configurations. It is becoming infeasible to provide a different software installation package and process for each combination of platform and configuration.

However, attempts to consolidate software installation packages and processes to operate with multiple storage platforms and configurations have caused problems. Such consolidation has caused lengthy installation times, manufacturing issues, non-robust behavior, and lack of ability to reset the system to a factory installed mode, just to name a few of the problems encountered. There is a need to provide a unified installation mechanism for multiple storage platforms and configurations that avoid and/or solve these problems.

SUMMARY

In one aspect, the invention provides a method of producing a unified scribed image for installing software on a plurality of storage systems. The method includes installing on a reference storage system reference system software comprising reference system core components usable by the plurality of storage systems having different setups, and reference system unique components used only by the reference storage system. The method further includes adding to the reference system software shared components used by pairs of storage system setups in the plurality of storage systems. The method also includes removing from the reference system software the reference system unique components, and scribing the remaining core components and shared components to media to produce the unified scribed image.

The core components may comprise an operating system. The shared components may comprise software for operating on an integrated storage system, or software for operating on a gateway storage system. The unique components may comprise any of a hostname, network, IP address, or storage configurations.

In another aspect, a computer program product includes logic for installing on a reference storage system reference system software comprising reference system core components usable by the plurality of storage systems having different setups, and reference system unique components used only by the reference storage system. The program product further includes logic for adding to the reference system software shared components used by pairs of storage system setups in the plurality of storage systems. The program product also includes logic for removing from the reference system software the reference system unique components. The program product further includes logic for scribing the remaining core components and shared components to media to produce the unified scribed image.

The core components of the program product may comprise an operating system. The shared components may comprise software for operating on an integrated storage system, or software for operating on a gateway storage system. The unique components may comprise any of a hostname, network, IP address, or storage configurations.

In accordance with another aspect of the invention, a method of installing storage system software in a current storage system includes installing software media in the storage system. The software media includes a unified scribed image thereon, the unified scribed image including core components which are required by all types of storage systems in a plurality of types of storage systems. The unified scribed image further includes shared components, some of which are required by the current storage system and some of which are not required by the current storage system. The unified scribed image also includes unique components which are required only by the current storage system.

The method first includes scanning the current storage system to ascertain whether software installation is required. Any shared components provided by the unified scribed image that are not required by the current storage system are deactivated. Any remaining shared components provided by the unified scribed image are activated. Then the unique components provided by the unified scribed image are activated.

The core components may comprise an operating system. The shared components may include software for operating on an integrated storage system. Or, the shared components may include software for operating on a gateway storage system. The unique components may include any of a hostname, network, IP address, or storage configurations.

In accordance with a further aspect of the invention, a factory reset may be performed by activating core components provided in the unified scribed image; activating all shared components provided in the unified scribed image; and deactivating the unique components.

In accordance with another aspect, a computer program product is provided comprising a computer useable medium having computer readable program code embodied therein. The program product includes software media including a unified scribed image thereon, the unified scribed image including core components which are required by all types of storage systems in a plurality of types of storage systems; the unified scribed image further including shared components, some of which are required by the current storage system and some of which are not required by the current storage system; the unified scribed image also including unique components which are required only by the current storage system. The program product further includes logic for scanning the current storage system to ascertain whether software installation is required; deactivating any shared components provided by the unified scribed image that are not required by the current storage system; activating any remaining shared components provided by the unified scribed image; and activating the unique components provided by the unified scribed image.

In accordance with a further aspect, the program product of the invention further includes logic for performing factory reset by activating core components provided in the unified scribed image; activating all shared components provided in the unified scribed image; and deactivating the unique components.

BRIEF DESCRIPTION OF THE DRAWINGS

The advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 14 is another representation of the contents of the system software that is deactivated from the loaded scribe as part of producing another individual storage system installation.

FIG. 15 is a representation of the contents of the system software that is activated from the loaded scribe of FIG. 14 as part of producing an individual storage system installation.

DETAILED DESCRIPTION

Figure 1:
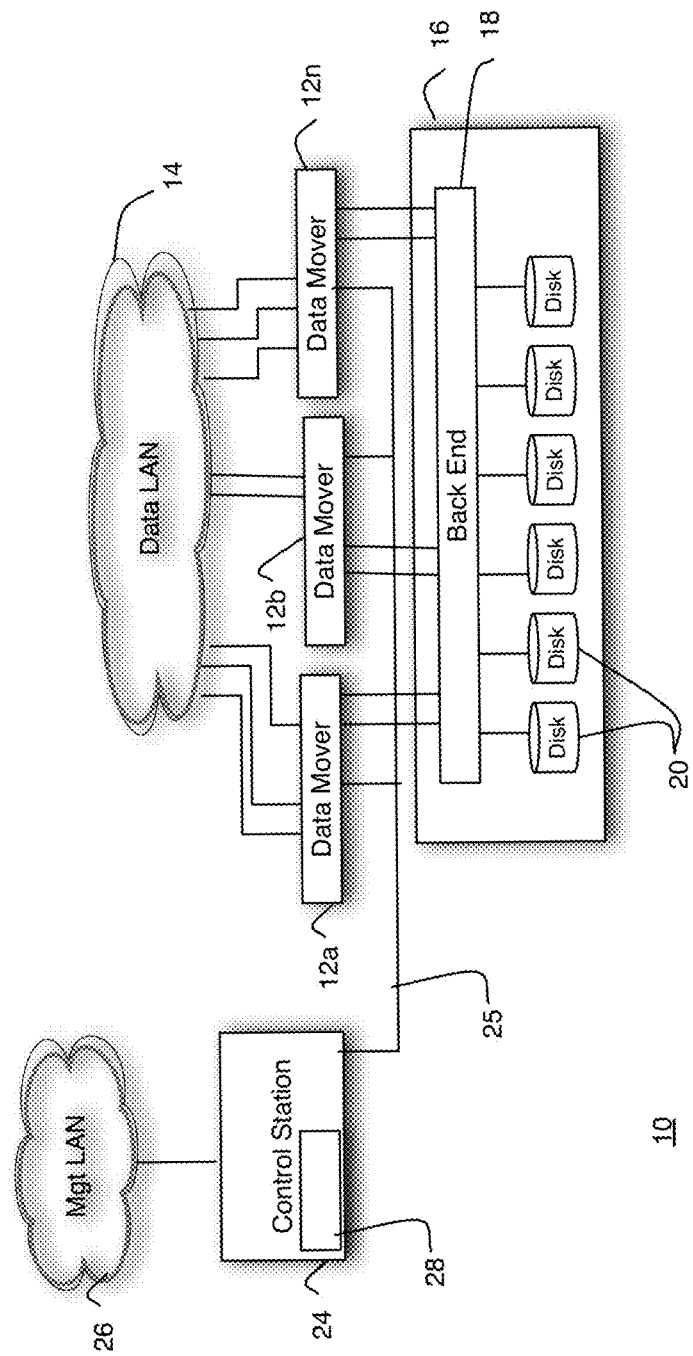
FIG. 1 is a functional block diagram of an embodiment of a storage system including a control station or control server, data movers, and back end.

In FIG. 1 there is shown an embodiment of a storage system 10 in which aspects of the invention may be deployed. The storage system 10 shown is an example of a one of the many configurations available within the Celerra® product family from EMC Inc. of Hopkinton, Mass. The Celerra product family covers a broad range of storage platforms, configurations and capabilities that scale across all ranges of networked storage. The family consists of common building blocks.

As shown, data movers 12a,b . . . n move data back and forth between a LAN 14 and a back-end 16 including backend channel connections 18 to storage disks 20. The data movers 12 are coupled to a control station 24 via a control station network 25. The control station 24, or control server 24 (CS) is the management station for the system 10. The control station and control server terms are interchangeable, and thus the term control server and/or CS will be used herein. The storage system 10 is configured and controlled via the CS 24. The CS 24 is shown coupled to a management LAN 26. Software may also be manually uploaded or downloaded from the CS via one or more media slots 28 for accepting media such as DVD, CD, or USB flash drives. The management LAN 26 may be connected to the data LAN 14, and both LANs 26 and 14 may be connected to the Internet.

Figure 2:
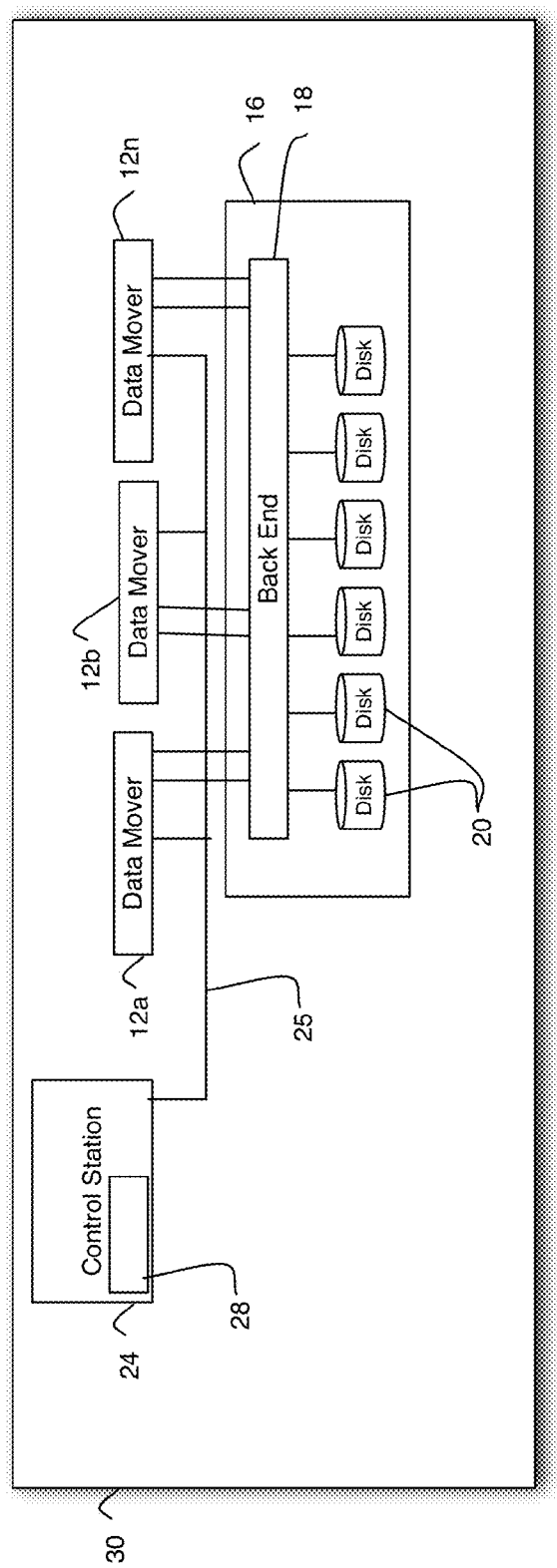
FIG. 2 is a modification of the block diagram of FIG. 1 showing the storage system arranged as an integrated system.
Figure 3:
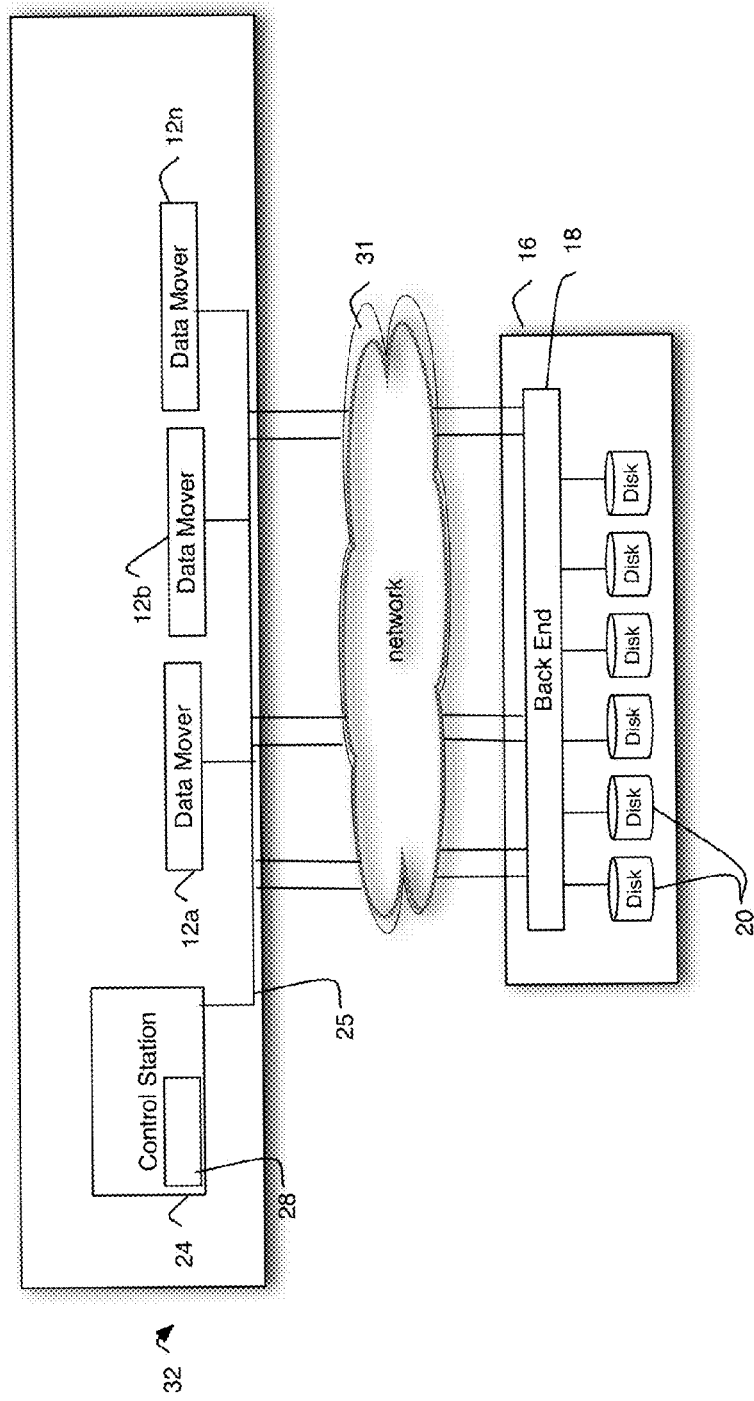
FIG. 3 is modification of the block diagram of FIG. 1 showing the storage system arranged as a gateway system.

The backend 16 including disks 20 may be local—that is the CS 24 and the backend 16 may all reside in one integral manufactured unit. This type of system is referred to as an integrated system 30, as shown in FIG. 2. Or, as shown in FIG. 3, the backend 16 may be separated from the CS 24 by a channel or network 31, such as a Fibre Channel or Ethernet, or several layers of channels and networks, etc. Here the back end 18 represents the channels/networks etc. This type of system is referred to as a Gateway system 32.

In either case, up to eight data movers 12a . . . n may be employed in the Celerra system 10, and up to four backend systems 16, depending on the Celerra configuration.

So, it can be seen that many different Celerra configurations exist. There are integrated platforms 30 and gateway platforms 32. Each of these platforms may employ various numbers of data movers 12a . . . n, and each data mover may employ various numbers and types of network interface cards to the data LAN 14. The gateway platforms further employ back-end storage systems 16 of varying configurations. There are newer and older versions of both of the many configurations of each platform. More particularly, variations of storage system setups and/or configurations include but are not limited to:

system hardware generation (varying by CPU type, motherboard type)

size of the storage system by number of fileservers (1, 2, 4, or 8)

number and types of interface cards on fileservers add-on interface cards (varying by connectivity type—iSCSI, Fibre, 1G Ethernet, 10Git Ethernet, combo Ethernet card, Offload Ethernet card, etc)

type of backend storage connectivity (integration setup, gateway setup)

type of backend storage system size of backend storage system (up to 4 storage systems connected)

Figure 4:
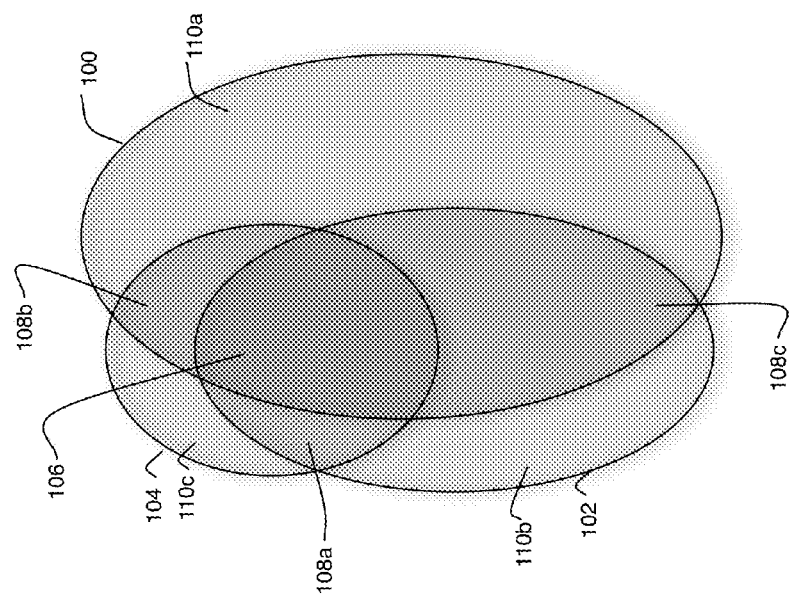
FIG. 4 is a representation of storage setups and core, shared, and unique components in accordance with the invention.

Although there are many different types of storage systems, as shown for embodied as Celerra systems above, their system software installations and configurations will have some commonalities. This is demonstrated diagrammatically in FIG. 4. Here, 3 different types of storage system setups 100, 102, and 104 are represented as a Venn diagram. Overlapping areas of the diagram represent software elements that are used by all of the overlapping system setups. "Setup" herein broadly refers to the type of hardware arrangement, software, and hardware/software configuration settings of a system. "Components" herein broadly refers to software elements, including and not limited to software components, applications, firmware, and drivers, as well as system configurations, settings, and services.

The region 106 that overlaps all three system setups represents the software components that are common/core components for all three system setups 100, 102, 104. For example, all three system setups may require the same OS kernel and certain kernel features. The regions 108a, b, c (collectively 108) represent components that are shared components between two or more system setups. Some system setups may or may not need the shared components 108 depending on their configurations, while others might. For example, two or more systems might be integrated systems that share setup features of integrated systems, whereas a gateway system does not require these setup features. The regions 110*a, b, c* (collectively 110) represent the unique components for each specific system setups 100, 102, 104 respectively. These components include the additional users inputs that typically would be applied during the final phase of the software installation (i.e. Hostname, network, IP address, storage configurations, etc).

In accordance with a prior art method, an installation software scribe previously provided to those building and/or installing systems, such as manufacturing, would include only the region 106, having the common/core components for all possible system setups. Then, each given system would be further separately configured during the manufacturing/installation process to complete the installation. For example, to build a system in accordance with the old method, a scribe including the only the core components would be provided for loading on the system (possibly pre-loaded). Then the shared components would be loaded. Finally the system specific configuration would be loaded. This is an inefficient and time consuming process.

Thus in accordance with the invention, there is provided a unified installation scribe image 120 that includes both the core component 106 and the shared components 108. Then, advantageously, only the system specific components 110 need to be separately installed by manufacturers or installers. Thus the time spent on software installation in manufacturing or at customer or other end sites can be significantly reduced.

Figure 5:
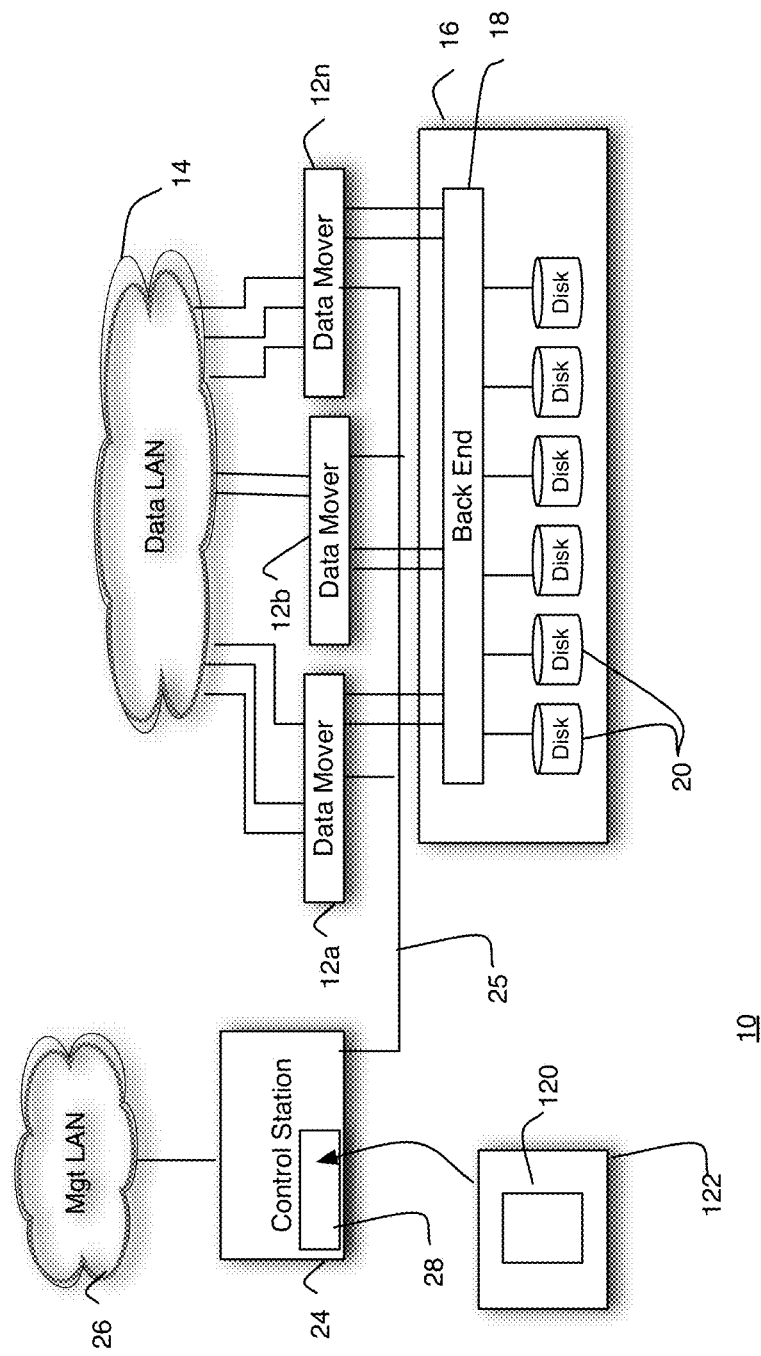
FIG. 5 is a block diagram showing the unified installation scribe of the invention on loadable media for insertion into the storage system.

Referring to FIG. 5, the unified installation scribe 120 may be conveniently provided on media 122 such as DVD, CD, or USB flash drive for installation onto CS 24 via media slot 28. One skilled in the art will understand that, although Celerra is herein described as an embodiment, the concepts of the invention may be employed widely as they apply to systems requiring software installations that must support differing underlying hardware and software setups and configurations, as many storage, network, and various peripheral and other systems do.

Figure 6:
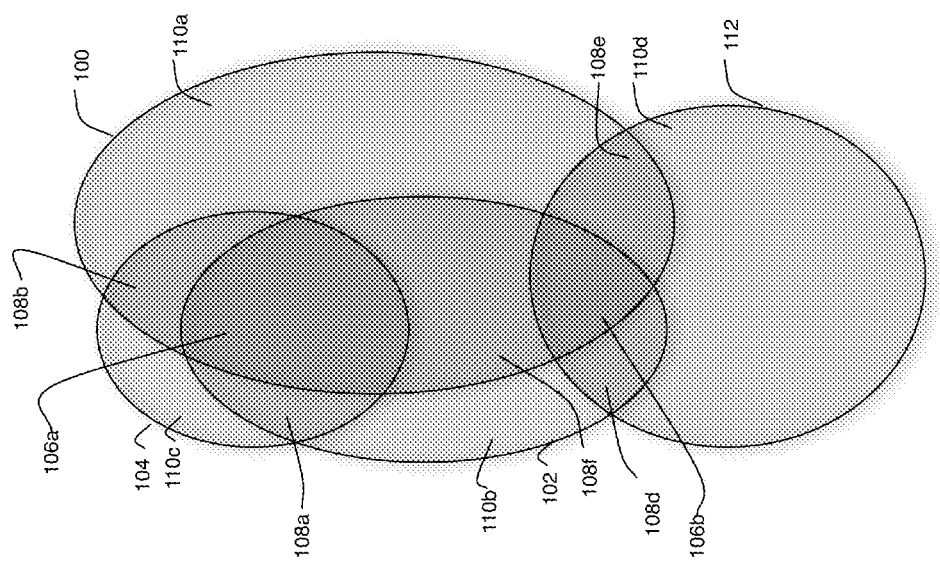
FIG. 6 is a is a representation of storage setups and core, shared, and unique components in accordance with the invention as shown in FIG. 4 including an additional storage system setup.

In order to provide the unified installation base scribing image, the system software dependencies between all the different possible system setups such as 100, 102, 104 must be understood. And, it must be understood how the configuration dependencies change when a new supported system is added to the set of supported system setups. Referring to FIG. 6, consider that another supported system 112 with a new system setup is added to the supported systems 100, 102, and 104 of FIG. 4. Now, the combination of the regions 106 and 108 are different than as was shown in FIG. 4 due to the fact the common/core components shared between all system setups, and the shared components shared between a subset of system setups has changed. Region 106 now has several regions 106 a and b. Region 108 now consists of regions 108 d, e, and f. The new product 112 also has its system specific region 110*d*. Note that, whereas in FIG. 4 region 108*c* was a shared component, shared between the two system setups 100 and 102, in FIG. 6 part of what was the shared component 108*c* of FIG. 4 has become core component 106*b* because of the addition of system setup 112 overlapping system setups 100 and 102. Thus the region 108*c* is now regions 108*d, e,* and *f*.

In order to provide the unified installation base scribe image, a scalable yet consistent solution to support even larger permutations of system setups than shown in FIG. 6 must be supported. In accordance with the scalable solution of the invention, first all possible supported system setups must be known. Then, all system software components are classified into three main categories as core (106), shared (108), or unique (110). Core components 106 are typically used by three or more system permutations. Shared components 108 are used by two system permutations only. Unique components 110 are used by a single system.

Figure 7:
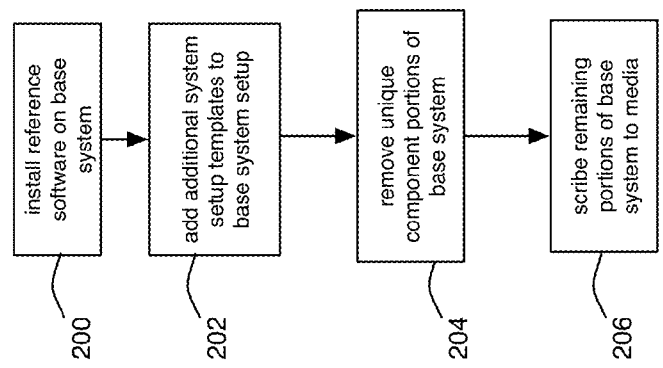
FIG. 7 is a flow diagram of the production of a unified installation scribe in accordance with the invention.
Figure 9:
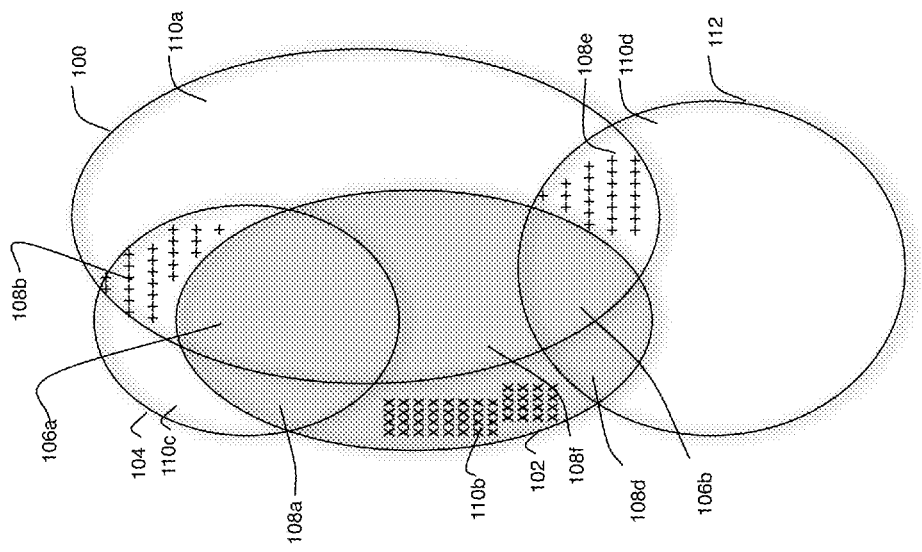
FIG. 9 is a further part of a visual representation of how a unified installation software image is produced in accordance with the method of FIG. 7.

In accordance with the invention, a unified scribed image 120 is produced that can be used to perform individual system setup for various permutations of supported system setups. The unified scribed image 120 would typically be produced by an engineering or software production organization for use by manufacturing and/or customer installation users. The method for producing the unified scribed image 120 is set forth in FIG. 7. The process is also shown diagrammatically in FIGS. 8-9.

Figure 8:
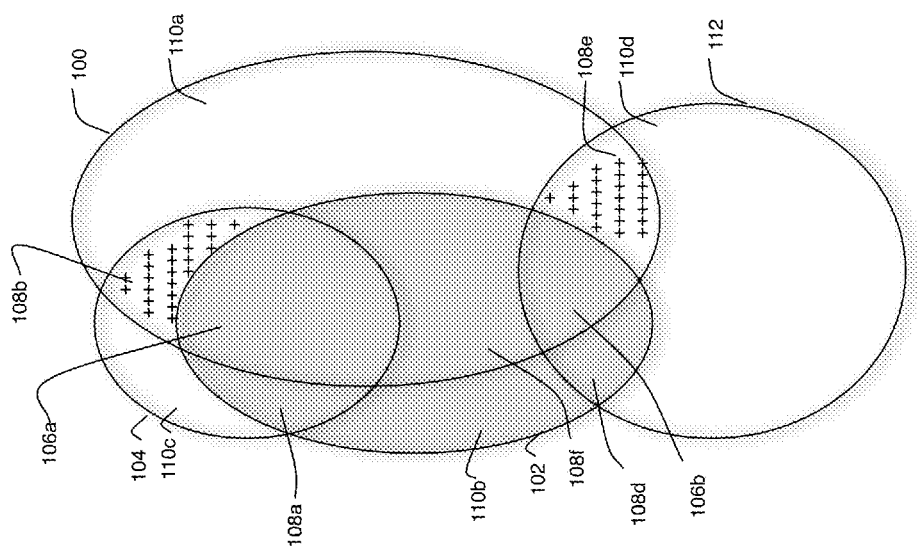
FIG. 8 is part of a visual representation of how a unified installation software scribe image is produced in accordance with the method of FIG. 7.

First, a known base storage system is set up, including a base storage software and configuration as a reference (step 200). The base system may be one of any number of possible system platforms and configurations as were referred to above. In FIG. 8, the base system setup is shown diagrammatically as 102. Other possible system setups 100, 104, and 106 are shown overlapping the base system setup 102 for convenience of further description. The reference software is a full software installation of all core, shared, and unique components associated with the base system setup 102. Thus the reference software includes core components 106*a,b* usable by all the system setups 100, 102, 104, and 112. The reference software further includes the shared components 108*a, c, d* that it shares with systems 100, 104, and 112. The reference software also includes its unique components 110*b*.

Upon completion of the base system setup, and in accordance with the invention, additional steps are taken to include necessary system configuration templates on to the base system (components 108*b*, 108*e*) (step 202). These templates will support the additional components needed to support additional system setup permutations beyond those of the reference system setup. (FIG. 8, components 108*b*, 108*e*).

Figure 10:
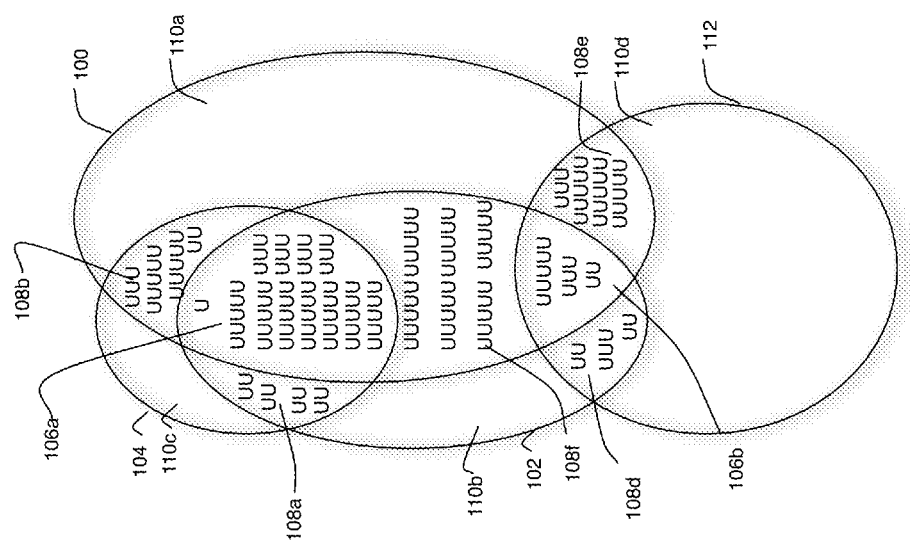
FIG. 10 is a representation of the contents of the system software that is scribed to produce the unified installation scribe.

Then, in further accordance with the invention the unique identity portion of the original base system setup 102, including all its associated components, is removed (step 204). This is represented by the removal of components 110*b* in FIG. 9. What is left represents the contents that are to be included in the unified software scribed image. Particularly, as shown in FIG. 10, components 106 a, b and 108 a, b, c, d, e are left to be included in the unified software scribed image 120. The collective components 106 and 108 contain all the core and shared components for all the possible supported system setup permutations. These portions of the original base system are scribed to media, such as DVDs or CDs or USB drives, to be distributed to manufacturers and/or installers of all the types of storage system setups to be used as the unified software installation scribe (step 206).

Figure 11:
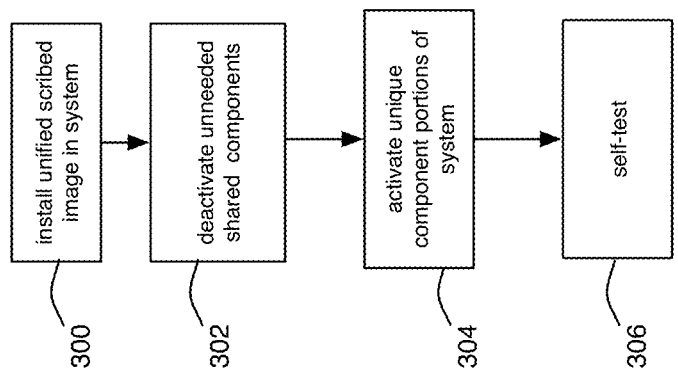
FIG. 11 is a flow diagram showing how the unified installation scribe can be used to install system software in a storage system.

Now the process of using the unified installation scribed image 120 to install software on a storage system is described. The method is shown in FIG. 11. The process is also shown diagrammatically in FIGS. 12-13. First, as a system is being built, for example, at a manufacturing site or a customer site, the unified scribed image as developed above has been installed for example via media such as a DVD or CD or USB flash drive via media slot 28 in a CS 24.

As the unified scribe image is deployed on a storage system, the system is scanned to determine if there are system operations to complete, in particular requiring software updating or installation. This process is referred to herein as system self-remediation.

Figure 12:
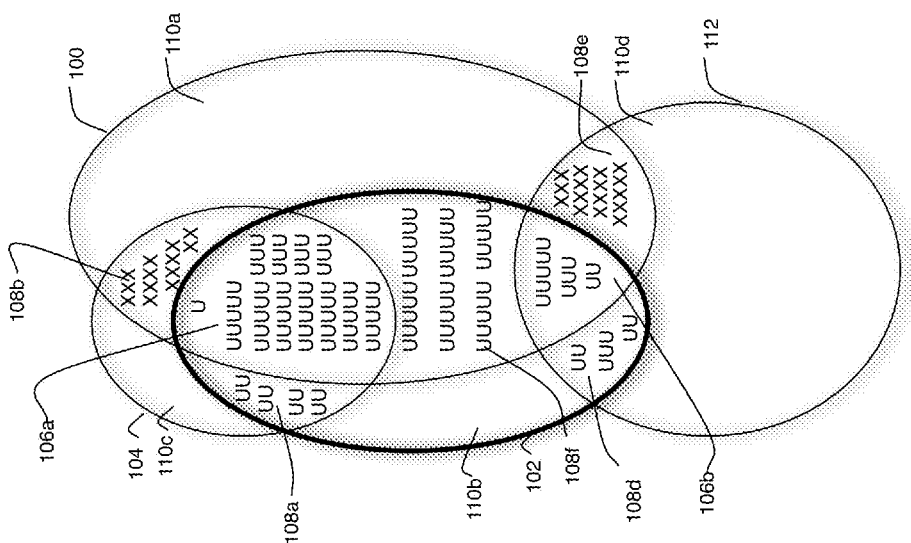
FIG. 12 is a representation of the contents of the system software that is deactivated from the loaded scribe as part of producing an individual storage system installation.

In accordance with an example, assume system software installation is occurring for the system setup represented in FIG. 12 by system 102. In this case, the self-remediation process would perform the following operations:

First, software configurations or services that are not required by the system 102 are deactivated (step 302). In this example these services are represented in FIG. 12 by the components 108*b*, 108*e*. Other shared components that are either needed or not harmful to the system remain activated. (E.g. components 108*a*, 108*d*.)

Figure 13:
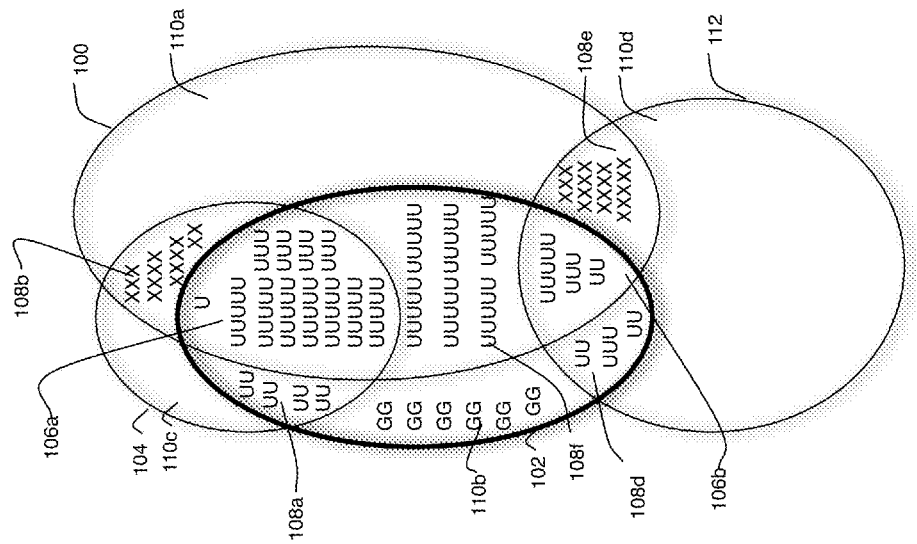
FIG. 13 is a representation of the contents of the system software that is activated from the loaded scribe of FIG. 12 as part of producing an individual storage system installation.

The unique components of the system software are then activated. (step 304), (FIG. 13. component 110*b*.) A Self-Test (step 306) is then performed, which may include but not be limited to cable checks, library verifications, components/services verifications, etc. to verify the correctness and integrity of the system based on its knowledge of the deployed setup of the system 102.

In accordance with another example, assume system software installation is occurring for the system 104 (FIGS. 14, 15). In this case, the self-remediation process would first deactivate components 108*c*, *d*, and *e* (step 302). Then unique system software components 110*c* would be activated (step 304) and self-test performed (step 306).

Figure 16:
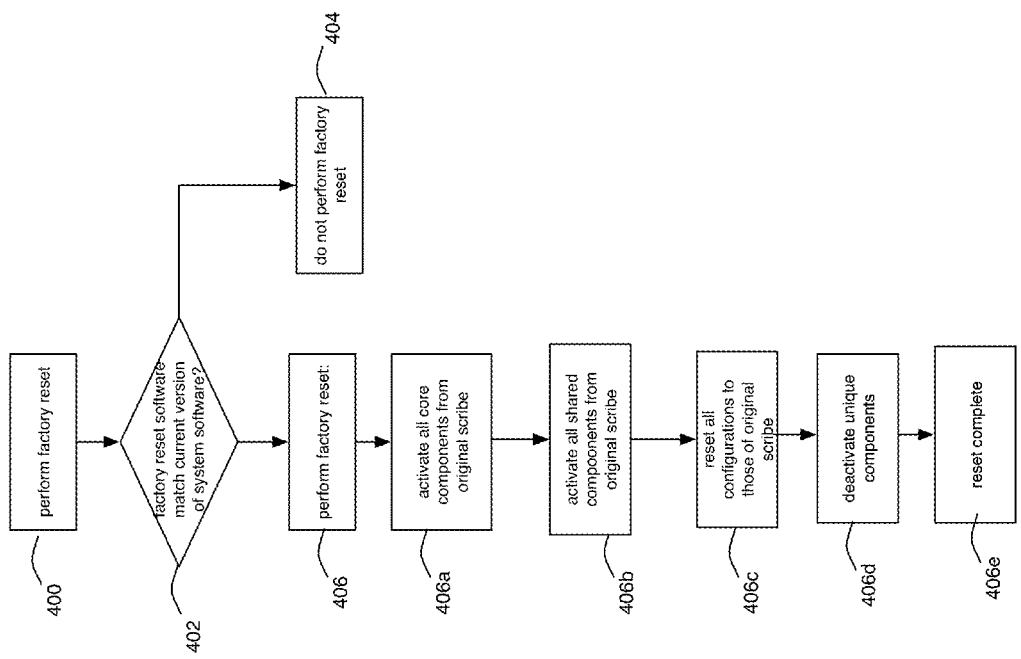
FIG. 16 is a flow diagram showing how the unified installation scribe can be used to perform a factory reset in a storage system.
Figure 17:
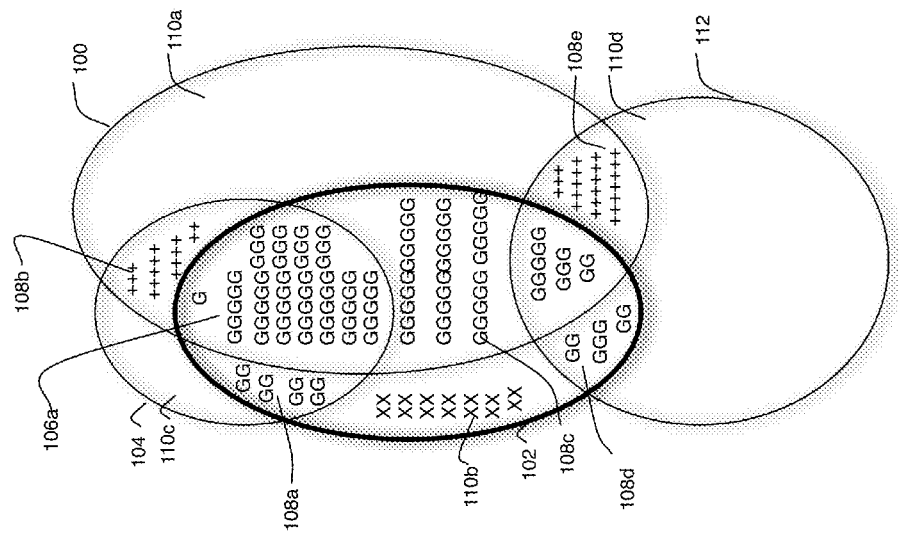
FIG. 17 is a representation of the contents of the system software that are activated and deactivated from the loaded scribe as part of the factory reset of FIG. 16.

In accordance with a further aspect of the invention, a factory default reset mode is provided with the unified scribed image in order to reset a given system to its factory default mode. The method of the factory reset default mode is set forth in FIG. 16. The process is also shown diagrammatically in FIGS. 17-18. For example, the system 102 of FIG. 13 has been successfully deployed but now needs to be reset to its factory default condition. Thus the core components 106*a* and 106*b* are activated, the shared components 108*a* and 108*e* are deactivated, and the unique component 110*b* is activated. The software to perform factory reset would already reside in the core region, either 106*a* or 106*b*, on the system 102. The factory reset software first checks to see if its version matches the current version of system software (step 402). If not reset is not allowed (step 404). If versions match, then the factory reset software proceeds with the factory reset functions (step 406). First, the factory reset software activates all the core components as deployed by the original scribe (step 406*a*). Then, the factory reset software activates all the shared components as deployed by the original scribe (step 406*b*), FIG. 18 108*b*, 108*e*. All configurations for system 102 are reset to those of the original scribe (step 406*c*). The previously deployed unique components (FIG. 18 110*b*) are deactivated—e.g. filtered and inaccessible. (step 406*d*). Factory reset is now complete (step 406*e*) and the system is reset to the state of FIG. 6.

The factory reset mode can be particularly useful, for example, after a system has been used in a marketing demonstration or a temporary purchase at a customer site. If the system is now to be re-used at another customer site, this is the manner in which it can be easily reset to factory default mode so that it can be then rebuilt to the new customer's specifications. In some cases, it may be useful to re-install only the backend scribe, such as when a gateway system is being re-configured for a different customer demo.

Once one skilled in the art understands the invention with respect to the described embodiments, it becomes clear that the invention applies broadly to systems requiring software installation for a control entity and peripheral entities wherein many configurations of the control and peripheral entities may be arranged. When deployed, the unified installation scribe of the invention helps to reduce engineering cycles through its scalable breakdown of system setups into core, shared, and unique components. Manufacturing stocking and shipping cycles are reduced since only unique components need be activated. Furthermore, the manufacturing process can be the same as that used by engineering quality assurance, thus reducing risk that can otherwise occur when manufacturing incorporates processes and/or software components not used and/or tested by engineering quality assurance. Finally, the unified installation scribe of the invention is advantageous over traditional scribes that are specific to particular system setups and thus require multiple images per system. Traditionally, for one system, a different scribe would have to be developed and then archived, distributed, and made available for every possible setup of that system. The unified scribe reduces engineering and manufacturing complexity and simplifies support and service because a single scribe image is the basis for all the possible system setups for a system—or, in other words, all the configurations for a product.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of producing a unified scribed image for installing software on a plurality of storage systems, comprising the steps of:
    installing on a reference storage system reference system software comprising reference system core components usable by a plurality of storage systems having different system setups;
    the reference system software also comprising unique components used only by the reference storage system;
    adding to the reference system software shared components used by pairs of storage system setups in the plurality of storage systems;
    removing from the reference system software the unique components; and
    after removing the unique components from the reference system software, scribing the core components and shared components to media to produce the unified scribed image.

2. The method of claim 1 wherein the core components comprise an operating system.

3. The method of claim 2 wherein the shared components comprise software for operating on an integrated storage system.

4. The method of claim 2 wherein the shared components comprise software for operating on a gateway storage system.

5. The method of claim 2 wherein the unique components comprise any of a Hostname, network, IP address, or storage system configuration.

6. A computer program product, comprising a computer useable medium having computer readable program code embodied therein, said program product comprising:
    logic for installing on a reference storage system reference system software comprising reference system core components usable by a plurality of storage systems having different setups;
    the reference system software further comprising unique components used only by the reference storage system;
    logic for adding to the reference system software shared components used by pairs of storage system setups in the plurality of storage systems;
    logic for removing from the reference system software the unique components;
    logic for scribing the core components and shared components to media after the unique components are removed from the reference system software, to produce the unified scribed image.

7. The program product of claim 6 wherein the core components comprise an operating system.

8. The program product of claim 7 wherein the shared components comprise software for operating on an integrated storage system.

9. The program product of claim 7 wherein the shared components comprise software for operating on a gateway storage system.

10. The program product of claim 7 wherein the unique components comprise any of a hostname, network, IP address, or storage system configuration.

11. A method of installing storage system software in a current storage system comprising the steps of:
    installing software media in the storage system, the software media including a unified scribed image thereon, the unified scribed image including core components which are required by all types of storage systems in a plurality of types of storage systems; the unified scribed image further including shared components, some of which are required by the current storage system and some of which are not required by the current storage system; the unified scribed image also including unique components which are required only by the current storage system;
    scanning the current storage system to ascertain whether software installation is required;
    deactivating any shared components provided by the unified scribed image that are not required by the current storage system;
    activating any remaining shared components provided by the unified scribed image; and
    activating the unique components provided by the unified scribed image.

12. The method of claim 11 wherein the core components comprise an operating system.

13. The method of claim 12 wherein the shared components comprise software for operating on an integrated storage system.

14. The method of claim 12 wherein the shared components comprise software for operating on a gateway storage system.

15. The method of claim 12 wherein the unique components comprise any of a hostname, network, IP address, or storage system configuration.

16. The method of claim 11 further including the steps of:
 performing factory reset by:
  activating core components provided in the unified scribed image;
  activating all shared components provided in the unified scribed image;
  deactivating the unique components.

17. A computer program product, comprising a computer useable medium having computer readable program code embodied therein, said program product comprising:
 a unified scribed image including core components which are required by all types of storage systems in a plurality of types of storage systems; the unified scribed image further including shared components, some of which are required by the current storage system and some of which are not required by the current storage system; the unified scribed image also including unique components which are required only by the current storage system;
 program code for scanning the current storage system to ascertain whether software installation is required;
 program code for deactivating any shared components provided by the unified scribed image that are not required by the current storage system;
 program code for activating any remaining shared components provided by the unified scribed image; and
 program code for activating the unique components provided by the unified scribed image.

18. The program product of claim 17 further comprising:
 logic for performing factory reset by:
  activating core components provided in the unified scribed image;
  activating all shared components provided in the unified scribed image; and
  deactivating the unique components.

* * * * *